(12) United States Patent
Sheldon

(10) Patent No.: US 12,321,349 B2
(45) Date of Patent: Jun. 3, 2025

(54) AUTOMATIC DATABASE QUERY LOAD ASSESSMENT AND ADAPTIVE HANDLING

(71) Applicant: ORACLE INTERNATIONAL CORPORATION, Redwood Shores, CA (US)

(72) Inventor: Stephen P. Sheldon, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/383,111

(22) Filed: Oct. 24, 2023

(65) Prior Publication Data
US 2024/0054128 A1 Feb. 15, 2024

Related U.S. Application Data

(63) Continuation of application No. 15/980,022, filed on May 15, 2018, now Pat. No. 11,829,362.

(51) Int. Cl.
G06F 16/2453 (2019.01)
G06F 16/2455 (2019.01)
G06F 16/28 (2019.01)

(52) U.S. Cl.
CPC .... *G06F 16/24542* (2019.01); *G06F 16/2455* (2019.01); *G06F 16/285* (2019.01)

(58) Field of Classification Search
CPC ........... G06F 16/24542; G06F 16/2455; G06F 16/285
See application file for complete search history.

(56) References Cited

U.S. PATENT DOCUMENTS 6,757,670 B1 6/2004 Inohara et al.
9,727,614 B1 * 8/2017 Sarmento ............ G06F 16/2457
(Continued)

FOREIGN PATENT DOCUMENTS

JP 2001-084257 A 3/2001
JP 2009-211588 A 9/2009
JP 2016-071837 A 5/2016

OTHER PUBLICATIONS

Stefan Krompass et al: "Managing Long-Running Queries", Extending Database Technology, ACM, 2 Penn Plaza, Suite 701 New York NY 10121-0701 USA, Mar. 24, 2009, pp. 132-143.
(Continued)

*Primary Examiner* — Ann J Lo
*Assistant Examiner* — Fernando M Mari Valcarcel
(74) *Attorney, Agent, or Firm* — Kraguljac Law Group LLC

(57) ABSTRACT

Systems, methods, and other embodiments associated with managing query loads are described. In one embodiment, a system is configured to define a fingerprint for received queries that are requested for execution on a database system and determine whether the defined fingerprint matches or does not match an existing fingerprint. For queries having a fingerprint that does not match an existing fingerprint: the system executes the query to completion and sets a classification for the fingerprint indicating the query (i) is flagged for evaluation or (ii) is permissible. For queries having a fingerprint that matches an existing fingerprint: determine whether the fingerprint was previously flagged and evaluate statistics for the fingerprint to determine whether execution will cause a negative impact on the system. The classification of the fingerprint is modified accordingly. The system controls execution of the query based on the classification of the fingerprint.

20 Claims, 7 Drawing Sheets

(56) References Cited

U.S. PATENT DOCUMENTS

| | | | |
|---|---|---|---|
| 2004/0158551 A1* | 8/2004 | Santosuosso | G06F 16/24542 |
| 2006/0155697 A1 | 7/2006 | Rosengard | |
| 2010/0082603 A1* | 4/2010 | Krompass | G06F 16/24542 |
| | | | 707/719 |
| 2010/0257154 A1 | 10/2010 | Pendap et al. | |
| 2010/0312776 A1 | 12/2010 | Burrichter et al. | |
| 2011/0302196 A1 | 12/2011 | Bouillet et al. | |
| 2014/0089311 A1 | 3/2014 | Richards et al. | |
| 2016/0127398 A1 | 5/2016 | Cohen | |
| 2016/0171070 A1* | 6/2016 | Hrle | G06F 16/2379 |
| | | | 707/615 |
| 2017/0316054 A9 | 11/2017 | Krompass et al. | |
| 2017/0351951 A1* | 12/2017 | Santos | G06F 16/285 |
| 2018/0060327 A1 | 3/2018 | Scarborough et al. | |

OTHER PUBLICATIONS

Patent Cooperation Treaty (PCT), International Search Report and Written Opinion of the International Searching Authority, issued in PCT International Application No. PCT/US2019/021287, having an International Filing Date of Mar. 8, 2019, having a Date of Mailing of: May 17, 2019 (13 pgs).

Intellectual Property India, Examination report under sections 12 & 13 of the Patents Act, 1970 and the Patents Rules, 2003 issued in India Patent Application No. 202047033876 on May 6, 2022 (7 pgs).

European Patent Office, "Communication Pursuant to Article 94(3) EPC", issued in EP Application No. 19 712 457.1 dated Jun. 21, 2022 (9 pgs).

Anonymous: "20.7. Performance Schema Statement Digests", Nov. 10, 2012 (Nov. 10, 2012), pp. 1-3, 055931959, Retrieved from the Internet: URL:https://web.archive.org/web/20121110191022/https://dev.mysql.com/doc/refman/5.6/en/performance-schema-statement-digests.html [retrieved on Jun. 15, 2022].

Tariq Ovais: "Profiling your slow queries using pt-query-digest and some love from Percona Server", Dec. 28, 2011 (Dec. 28, 2011), pp. 1-10, XP055931965, Retrieved from the Internet URLhttps://www.ovaistariq.net/profiling-your-slow-queries-using-pt-querydigest-and-some-love-from-percona-server/[retrieved on Jun. 15, 2022].

Japanese Patent Office, "Notice of Reasons for Rejection", issued in Japanese Patent Application No. 2020-549707, having a date of drafting Apr. 5, 2023 (4pgs).

Chinese Patent Office, First Office Action issued in Chinese Application No. 201980014605.7 on Feb. 29, 2024 (6 pgs).

* cited by examiner

AUTOMATIC DATABASE QUERY LOAD ASSESSMENT AND ADAPTIVE HANDLING

CROSS REFERENCE TO RELATED APPLICATION

This disclosure is a continuation of and claims the benefit of priority to U.S. patent application Ser. No. 15/980,022, entitled "Automatic Database Query Load Assessment and Adaptive Handling," filed May 15, 2018, which is incorporated herein by reference in its entirety for all purposes.

BACKGROUND

Cloud based applications such as Oracle Service Cloud, for example, include application programming interfaces ("APIs") that allow users of remote client terminals to specify custom queries to be executed against an application object. Query tools such as RightNow Object Query Language ("ROQL"), that enable the remote client terminals to initiate the queries, impose few upfront checks or limits on the queries that users can create. Because of the lack of upfront constraints on user-defined queries, a problematic query that is inefficient, or insufficiently bounded, may be defined and invoked. Execution of such problematic queries consumes significant network and database management resources (CPU time, database connections, network bandwidth, network communications, memory, etc.). The significant resources consumed to execute a problematic query negatively impacts the performance of the application object for the client terminal that initiated the query, and also other client terminals at a corporate entity that access the application object in the cloud environment. The negative impact can even affect client terminals at different entities that share the affected resources in the cloud application environment.

Attempts to limit the execution of problematic queries have involved establishing a maximum allowable runtime for acceptable queries. All queries having a runtime that exceeds the maximum allowable runtime without being completed are terminated. Such an approach does limit the effects of executing that one problematic query. However, the performance impact can still be experienced for a period of time until the runtime of the problematic query reaches the maximum allowable runtime. Repeated execution of the same problematic query subjects the application object to the same negative impact that the application object experienced the first time the problematic query was invoked. Further, because the problematic query is terminated before being completed, the client terminal that invoked the query does not receive the result of the query, despite causing a negative impact on the performance of the application object.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
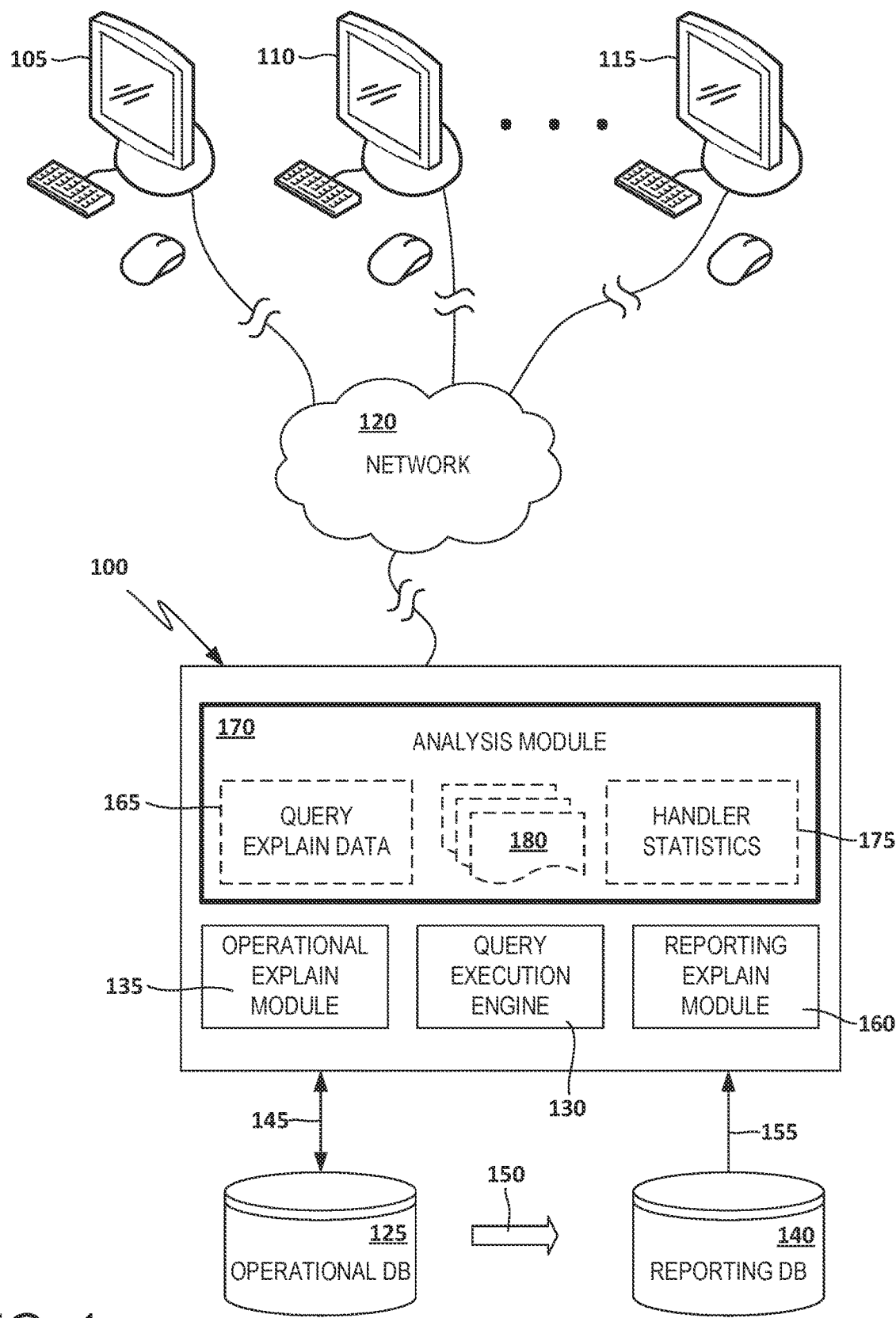
FIG. 1 illustrates an embodiment of a cloud-based database system that automatically assesses and adaptively handles database query loads to efficiently utilized computational and network resources.

Systems and methods are described herein that provide automated assessment of database query loads and adaptive handling of queries to maintain performance of a cloud-based application object. Cloud based applications such as Oracle Service Cloud, for example, include application programming interfaces ("APIs") that allow users of remote client terminals to specify custom queries to be executed against an application object. Query tools such as RightNow Object Query Language ("ROQL"), that enable the remote client terminals to initiate the queries, impose few upfront checks or limits on the queries that users can create. As a result, it is inevitable that the execution of some problematic queries will produce large loads on the database that severely impact the performance of an application object.

Previous attempts to block problematic queries have involved adding such queries to a data structure defining a so-called "blacklist" of problematic queries, which constitutes a class of queries to be blocked from being executed. Invocations of blacklisted queries are handled by being blocked from execution solely because they take too long to complete. However, adding a query to a blacklist for the sole reason that the problematic query took too long to complete is too rigid, and results in an unacceptable number of "false positives." False positives are queries that, despite exceeding a threshold runtime, are not the root cause of the extended runtime required to complete the query. After all, there are many factors unrelated to the query (e.g., network traffic, number of concurrent database connections, etc.) that can cause the runtime of the query to exceed the threshold runtime.

Another previous attempt to reduce the number of false positives added to the blacklist, another class of permissible queries defined by a so-called "whitelist" has been created. The whitelist includes a collection of permissible queries that are to be executed to completion when invoked by a remote client terminal. To be added to the whitelist, queries are to be analyzed to determine whether an aspect of the query itself causes an unacceptable negative impact on the performance of the application object. However, analyzing every query unnecessarily consumes database and network computational resources, and can lead to the very negative impact on performance sought to be mitigated. For example, a one-off query that is invoked only once will be analyzed to determine whether to add that one-off query to the blacklist or the whitelist. Computational and network resources are consumed to perform the evaluation, thus negatively impacting the performance of the application object. However, the benefit of performing the analysis will never be realized to offset future negative impacts because the one-off query is never again invoked.

Additionally, use of a rigid blacklist and whitelist structure in a conventional manner may not adequately adapt to database changes or other changes that are unrelated to the parameters of the query itself. Such changes may alter the negative impact of the query on the application object's performance, even if the query has previously been analyzed and whitelisted. For example, as the data in a database evolves over time (e.g., dramatically increases in size), or the schema of the database changes, a subsequent invocation of a whitelisted query may cause an unacceptable negative impact on the application object. An adaptive approach to handling such future invocations of the query should recognize the impact of such changes that occur after a query has been analyzed and classified. In response to recognizing such changes, the adaptive nature of the system and method can automatically update the classification of the affected query to address negative impacts that could result from future invocations of the query.

The present disclosure involves a system and method for analyzing database queries and controlling execution of queries that the system suspects will cause a large load on the system. In one embodiment, identified queries that are suspect are classified in response to a second, or later execution of the query having a fingerprint that has been evaluated and deemed to cause a negative impact on the system. Future executions of the query are controlled based on the classification (e.g., blacklisting classification). The present system and method use a metric beyond just elapsed time for a query to be completed to determine if that query should be blacklisted or otherwise classified. According to one embodiment, the present system and method use the time required to execute a query the first time the query is invoked to determine whether queries having a fingerprint that is associated with the query should be analyzed in response to a later invocation of a query having a matching fingerprint. Such an analysis assesses the load and impact of executing queries having the fingerprint on the performance of an application object that has a plurality of concurrent users, and is accessible over a communication network. If the duration of a query invoked for the first-time (or other early instance such as a second, third, fourth, etc. invocation) exceeds a completion threshold time, the fingerprint of the query is designated for evaluation in a data structure (e.g., table of queries pending analysis). The query fingerprint can be flagged or otherwise designated in the data structure as pending evaluation to determine if a query corresponding to the query fingerprint is permitted to be executed, or should be blocked in response to future invocations of the query.

To mitigate the negative impacts on the application object that would result from analyzing the fingerprint for a one-off query, the query executed in response to the initial invocation is executed to completion, even if the query exceeds the completion threshold time. The result of the fully-completed query can be achieved, and a notification of completion optionally returned to the client terminal over a communication network such as the Internet, a private network, or another suitable communication network. Analysis of the query fingerprint to determine the impact of the query on the application object's or system's performance, however, is not performed in response to the first-time the query is invoked, which resulted in the query's fingerprint being designated for evaluation.

In response to a second-time or subsequent query being received that includes the fingerprint that has been flagged or otherwise designated as requiring evaluation, an analysis module uses available information to assess the query load corresponding to the fingerprint. Available information can include any low-overhead information such as query explain data, and database management server handler statistics (referred to herein as "handler statistics"), for example. Such available information is generated through standard management of the database for the purpose of reading and/or writing data to the database. The query explain and handler statistics can be utilized because such data is readily available to the analysis module without requiring activation of a database resource (e.g., network communications, internal instruments required to measure database performance statistics, etc.) specifically for the purpose of collecting the data. Activating such a database resource specifically to measure database performance would itself impose an additional load on the present system, which is sought to be mitigated. Thus, separately measured database performance statistics that are not available as a result of standard operation of the database to execute the query can optionally be excluded from consideration.

For a query against a particular fixed set of data in an operational database, the query explain data and handler statistics for the query are generally constant as compared to the elapsed time of the query. The elapsed time of a query can differ for different invocations of the same query depending on factors independent of the query itself, such as the loading of the database at a time when the queries are executed. Thus, the query explain data and handler statistics are suitable considerations in analyzing a query fingerprint to determine the true resource load imposed by queries utilizing the query fingerprint itself, and accordingly, the impact such queries will have on the application object (e.g., a negative impact or acceptable impact based on a defined threshold). Although the present system and method use the elapsed time of a query's execution compared to a threshold as the trigger for evaluating query fingerprints that should possibly blacklisted, those elapsed times are not the sole determining factor in deciding whether to actually blacklist a query fingerprint. Instead, explain data and handler statistics will be used to conduct an analysis that will be consistent for the fingerprint in the absence of changes to the database or data in the database. The result of the analysis will also be the same regardless of whether the query is to be executed against the operational database or the reporting database.

According to another embodiment, other information indicative of the load imposed by, or the impact of a query can be considered as part of the analysis. For example, MySQL performance information can be a factor considered during an analysis of the queries. The 'show profile' or performance_schema include useful information. But since those tools introduce overhead by activating internal instrumentation that is not already activated to execute queries, but only to gather the data, such data can optionally be excluded from the analysis.

Consideration of available information such as the query explain and handler statistics, for example, also allows the present systems and methods to adapt to changes in the database. For example, changes to the data volume, table statistics, indexes, etc. will be reflected in such available information. The present systems and methods can detect such changes based on trends in the execution of queries and designate, in the data structure, a query fingerprint affected by the changed data for re-evaluation. Further, a stale query that has not been updated after a defined number of invocations have occurred can also be flagged or otherwise designated for re-evaluation in the data structure. The analysis of the query fingerprint described herein can again be performed based on the changed data to re-evaluate the load and potential negative impact of the query on the application object.

Based on the result of the evaluation of the query fingerprints, the analysis module modifies the data structure to include a classification of the query fingerprints into one of a plurality of different query classes. For example, the different query classes can include at least: (i) a permissible query class (e.g., the whitelist) that includes queries designated for execution when subsequently invoked, and (ii) a blocked query class (e.g., the blacklist) that includes queries to be prevented from being executed when subsequently invoked. In one embodiment, as described below, a query execution engine is configured to control execution of first-time queries and subsequently received query requests (e.g., not a first-time query) based on the classification of the query's fingerprint. The query execution engine may be an executable function or module that is executed by one or more processors.

The system uses, at least in part, the classification of a query fingerprint to control execution of queries having such a fingerprint in response to the same or similar queries being subsequently received for execution. Subsequent queries having the query fingerprint classified in the permissible query class can be executed against the operational database. The queries having a query fingerprint classified in the blocked query class can be blocked from execution in response to future invocations of such queries. For example, when the same or similar query (a query including the same fingerprint) is submitted for execution and is detected as being in a blocked class, the system blocks the execution of the query. Thus, the system avoids consuming large amounts of computing resources that would be used by executing a blocked query.

According to alternate embodiments, the query fingerprints can be classified in a third class, referred to herein as a redirected query class. Queries having a query fingerprint in the redirected query class have a negative impact on the application object, but not a negative impact as severe as the negative impact caused by the queries having a query fingerprint in the blocked query class. Queries with fingerprints in the redirected queries class are to be executed against a second database, such as a reporting database for example, that is different and separate from the operational database. Thus, the performance of the operational database can be maintained by blocking queries that have a profound negative impact on the application object. Queries with query fingerprints in the redirected query class can be executed against the reporting database, despite their moderate negative impacts.

With reference to FIG. 1, one embodiment of a cloud-based database system 100 associated with automatically assessing and adaptively handling database query loads to efficiently utilize computational and network resources is shown. The database system 100 is operatively connected to communicate with a plurality of client terminals 105, 110, 115 over a communication network 120. The client terminals 105, 110, 115 can receive user-defined parameters for a query, and remotely invoke the query against a database 125. The invocation of a query refers to the database system 100 receiving a request for execution of the query transmitted by one or more of the client terminals 105, 110, 115. The database 125 can be accessible to a cloud-based application object hosted by, or associated with the database system 100.

According to one embodiment, the client terminals 105, 110, 115 or the database system 100 can be a computing device 300, as shown and described with reference to FIG. 3, for example. For example, the database system 100 includes a query execution engine 130. The query execution engine 130 is operable to receive the user-defined query parameters and generate an explain plan for the query to be executed against a database such as the operational database 125, for example, based on the received parameters. The explain plan includes an ordered set of execution steps used to access data in the database. Each execution step has information about the select type (e.g., SIMPLE, PRIMARY, UNION, etc.), the join type (e.g., CONST, REF, RANGE, etc.), the table name, and optionally other aspects of the query. The execution engine 130 determines the execution plan for the query, and defines the execution plan in the explain plan when instructed to do so, such as in response to invocation of the "explain" statement.

Information included in the explain plan can be included in a generic definition of a query referred to herein as a "fingerprint" or a "query fingerprint." The fingerprint of a query is composed from a "normalized" or "generic" signature of the original query. For example, values specific to the query that was invoked are excluded from the signature, the query tokens are converted into lower case lettering, standard name aliases are applied in the signature, etc. The result is a generic description of the functional aspects of the query, expressed in generic or standardized terms. The generic description of the signature is not specific to the query that was invoked, and can represent the structure of different queries. For example, the following query:

SELECT i.id FROM incidents i WHERE due_date>"11 May 2018" AND queue_id=3 can become the query signature:

select t1.id from incidents t1 where t1.due_date>?date and t1.queue_id=?number and the fingerprint can be a fixed size hash of the query signature (e.g. 6f9d069c301dce23bae834f08795a110766de334). The explain plan can be obtained after the query fingerprint is derived. Thus, the fingerprint of a query can be considered a unique identifier of the query based on at least the generic functions to be performed during execution of that query.

Query specific information and parameters, such as the specific location in a database where data to be accessed during a specific invocation of a query, for example, can be omitted from the fingerprint, in one embodiment. Thus, the fingerprint can indicate the functional aspects of a first query, and these functional aspects can be found in common with one or more other queries that differ from the first query by the query-specific parameters of each query. In other words, two queries may have the same fingerprint but are not identical queries.

References to the evaluation of a query herein encompass the evaluation of the query or the query fingerprint. Information associated with a query such as the statements included in an explain plan, the execution plan, and other such information used to characterize the query's fingerprint is referred to herein as "query explain data." The query explain data for the database 125 can be stored in, or retrieved from a memory by an operational explain module 135 provided to the database system 100. In one embodiment, two queries can have the same matching fingerprint but not be identical queries. For example, queries A and B that both have a fingerprint XYZ can have different explain plans, but the explain plan that resulted from the most-recent (or other previous) evaluation is associated with the query.

Similarly, queries having a fingerprint that, if executed, would negatively impact the performance of the application object can be redirected to, or otherwise executed against a reporting database 140 as described herein. The reporting database 140 can be configured to store data that is also stored in the operational database 125. However, the reporting database 140 can be utilized by the database system 100 differently than the operational database 125. For example, the operational database 125 can be repeatedly accessed by the client terminals 105, 110, 115 via the database system 100 to read data from, and write data to the operational database 125. The bi-directional communications are represented generally by the double-ended arrow 145. At least some of the data maintained by the operational database 125 can be redundantly stored in the reporting database 140 as indicated by arrow 150. Access to the reporting database 140 can be limited to read operations as indicated by unidirectional arrow 155. According to another embodiment, the reporting database 140 can perform a role in association with the application object that is limited relative to the role of the operational database 125. The query explain data for the reporting database 140 can be stored in, or retrieved from a memory by a reporting explain module 160 provided to the database system 100.

The query explain data from the operational explain module 135 and the query explain data from the reporting explain module 160 can be stored in a data structure as query explain data 165. The query explain data 165 is linked to the respective queries corresponding to that query explain data 165, and is accessible to an analysis module 170 for evaluating an impact on the application object by a query with a fingerprint corresponding to the query explain data 165. Examples of the query explain data 165 include, but are not limited to: the type of key that will resolve to a single row, a type of query invoked, and an identifier for the invoked query.

The analysis module 170 can also access handler statistics 175 stored in a memory for queries executed by the query execution engine 130. The handler statistics 175 can include any data related to how often or how frequent certain data in the database 125 is accessed, read, added, etc. Examples of the handler statistics include, but are not limited to: (i) the number of times the first entry in an index was read, (ii) the number of requests to read a row in a table based on a key, (iii) the number of requests to read the last key in an index, (iv) the number of requests to read the next row in key order, (v) the number of requests to read the previous row in key order, (vi) the number of requests to read a row based on a fixed position, (vii) the number of requests read the next row in the data file, and (viii) the number of requests to insert a row in a table.

The analysis module 170 is configured to generate a data structure 180 that identifies a query, and flags or otherwise designates the query as requiring evaluation if the duration of the query, after being fully executed, exceeds a completion threshold time. For example, the data structure can include a table of records that identify fingerprints corresponding to queries that are currently designated as requiring evaluation (flagged for evaluation), or were previously evaluated and have since been classified into one of a plurality of different classes of query. The fingerprint for each query can optionally be designated in the data structure as requiring evaluation in response to a first-time invocation of those queries. The evaluation is conducted to determine whether the query itself is a substantial cause of an unacceptable negative impact on the application object. This evaluation can be deferred until a query utilizing the fingerprint is subsequently invoked. By deferring the evaluation, the evaluation is not performed in response to the first-time the query is invoked, which is when the fingerprint was designated for evaluation. As a result, if the query is a one-off query, system and network resources are not consumed to unnecessarily evaluate the fingerprint corresponding to a query that is not invoked again. Thus, at least two queries having a fingerprint need to be received by the system before the fingerprint is evaluated.

The embodiment of the database system 100 shown in FIG. 1 can be a computing/data processing system including an application or collection of distributed application objects for enterprise organizations. The application objects and database system 100 may be configured to operate with or be implemented as a cloud-based networking system, a software-as-a-service ("SaaS") architecture, or other type of networked computing solution. In one embodiment the database system 100 serves content to one or more of the client terminals 105, 110, 115, allowing the recipient client terminal 105, 110, 115 to perform at least the functions disclosed herein with respect to receiving query parameters and invoking queries against the database 125. The database system 100 can be concurrently accessed by many client terminals 105, 110, 115 as separate, remotely-located computing devices/terminals communicating with the database system 100 (functioning as the server, for example) over the communication network 120.

In one embodiment, one or more of the components or aspects of the database system 100 described herein can be configured as program modules stored in a non-transitory computer readable medium. The program modules are configured with stored instructions that when executed by at least a processor cause one or more computing device(s) of the database system 100, to perform the corresponding function(s) as described herein.

FIGS. 2A-2F illustrate one embodiment of a method 200 associated with a database system 100 that automatically assesses query loads and adaptively handles those query loads to maintain a desired performance of an application object. The present method involves evaluating the fingerprints of queries based on query explain data 165 and handler statistics 175 to assess the load of the query, when executed, imposed on the database system 100 or application object. The evaluation of such a load is referred to hereinafter as evaluating or determining the "query cost." The fingerprints of "expensive" or "costly" queries impose a significant load on the database system 100 that consume an undesirable amount of computing resources (e.g., based on a threshold value). Therefore, the costly queries are considered to cause an unacceptable negative impact on the application object's performance and/or the system when the query uses an amount of resources beyond a set threshold amount. Computing resources may include, but are not limited to, CPU time, database connections, network bandwidth, network communications, memory, and/or other resources used in processing queries. Costly queries are, in one embodiment, blocked from execution in response to detecting future invocations of the same or similar query to mitigate poor application object performance experienced by the client terminals 105, 110, 115. To the contrary, fingerprints for "low cost" or "inexpensive" queries with a "small cost" are generally considered to be permissible, and are executed in response to detecting future invocations of the same or similar low cost queries.

Figure 2A:
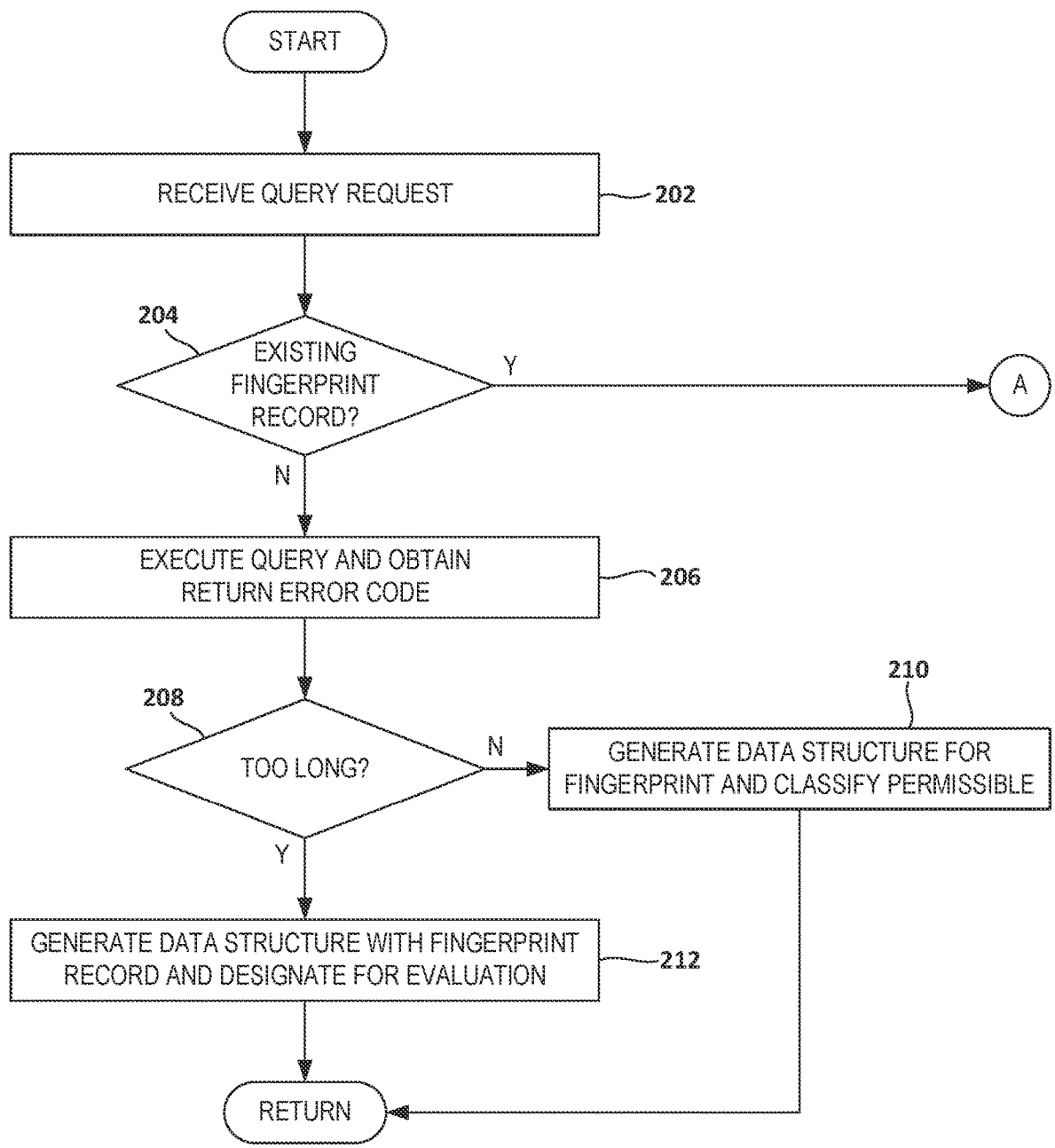
FIGS. 2A-F illustrate a flow diagram graphically depicting one embodiment of a method associated with assessing and adaptively handling query loads.

In FIG. 2A, a query request submitted for execution by a client terminal 105 is received by the analysis module 170 at block 202. In one embodiment, the query request is intercepted by the analysis module 170 prior to the query being executed to allow the system to determine if execution of the query is to be controlled as previously explained. The query request is received over the communication network 120, and includes one or a plurality of statements defining one or more operations to be performed during execution of the query. The statements received as part of the query request define the fingerprint of the query that the analysis module 170 uses for uniquely identifying the combination of operations that are to be executed as part of the query. At block 204, the fingerprint of the received query is compared to entries in a data structure 180 that include the fingerprint information for previously-received queries to determine if another query request with the same fingerprint has previously been received.

If an existing record for the fingerprint of the received query request does not exist (e.g., no matching fingerprint), the query is executed to completion and the error code returned is obtained at block 206. The error code includes information that indicates whether execution of the query exceeded a completion threshold time. For example, the returned error code can be "OK," which indicates that full execution of the query took less than the completion threshold time. The error code can be "DIVERT" or "TOO LONG," each of which indicates that the duration of the query exceeded the completion threshold time. The error code "TOO LONG" can indicate that the duration of query execution was so long that execution of future invocations of the query against either the operational database 125 or the reporting database 140 should be prevented. The error code "DIVERT" can indicate that the duration of query execution exceeded the completion threshold time, and is therefore costly, but the query can still be executed against the reporting database 140 instead of the operational database 125.

At block 208, based on the returned error code, the analysis module 170 determines whether the query exceeded the completion threshold time. If not, then at block 210 the analysis module 170 can optionally generate a data structure 180 (FIG. 1) including information about the query, such as the query fingerprint for example, and a designation of the query as not requiring evaluation at this time. Instead, the query fingerprint is classified in a "permissible" query class including queries allocated to the whitelist. Whitelisted queries do not impart a significant negative impact on the application object, and are deemed to be executable against the operational database 125 in response to future invocations. Further, the negative impact of whitelisted queries is such that further evaluation of queries based on the explain data and handler statistics in response to a second, or later invocation of a query with the same fingerprint is not required to classify those queries.

To further improve system performance, the generation of the data structure 180 at block 210 (or other modification of a data structure) to add a query fingerprint to a whitelist can optionally be omitted. Substantial storage costs would be incurred to maintain a library of whitelisted queries. Instead of maintaining a library of whitelisted queries, queries associated with a fingerprint that is not blacklisted or otherwise classified as described herein can simply be executed against the operational database 125 when such queries are invoked.

If, at block 208, the analysis module 170 determines that execution of the query exceeded the completion time threshold, the analysis module 170 generates the data structure 180 at block 212. The data structure 180 is generated to include the information about the query, and sets a corresponding flag bit or other type of status designation of the query fingerprint to indicate that the query fingerprint is flagged for evaluation (e.g., a classification of the query fingerprint). Since this is the first time that the query has been flagged, the query is fully executed against the operational database 125.

However, after being flagged for evaluation and designated for evaluation in the data structure 180, the same or similar query will be evaluated if the query is subsequently submitted for execution again. For example, the query fingerprint is to be analyzed based on the explain data and the handler statistics in response to a second or later invocation of a query having the same fingerprint in the future. This additional analysis will determine whether the query fingerprint is to be classified in a "blocked" query class. The blocked query class includes fingerprints for queries that have been blacklisted. Such a classification by the analysis module 170 will control operation of the query execution engine 130 to prevent a query having a blacklisted query fingerprint from being executed against the operational database 125 and/or the reporting database 140, when the same or similar query is subsequently submitted or invoked for execution by a client terminal 105, 110, 115. In one embodiment, the query execution engine 130 is configured to control execution of a query based on the query's classification, and the engine is executed to control the execution of queries.

Figure 2B:
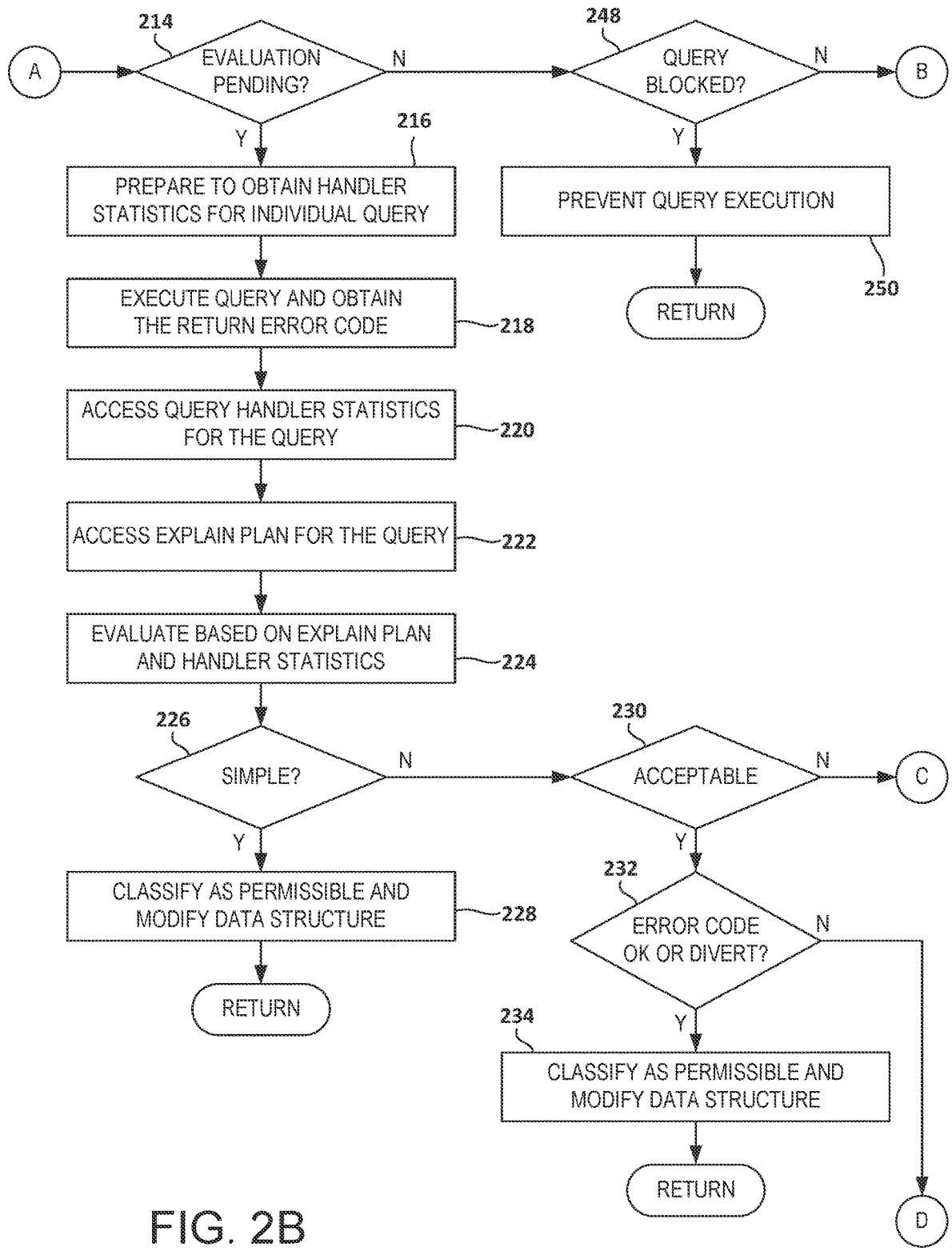
Figure 2C:
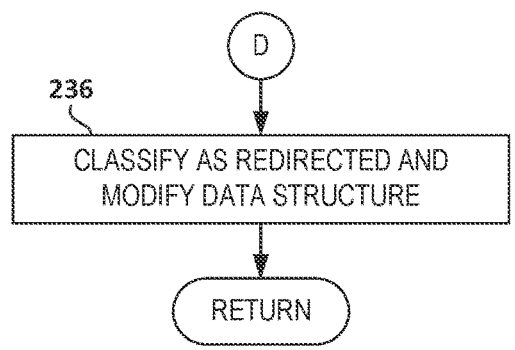
Figure 2D:
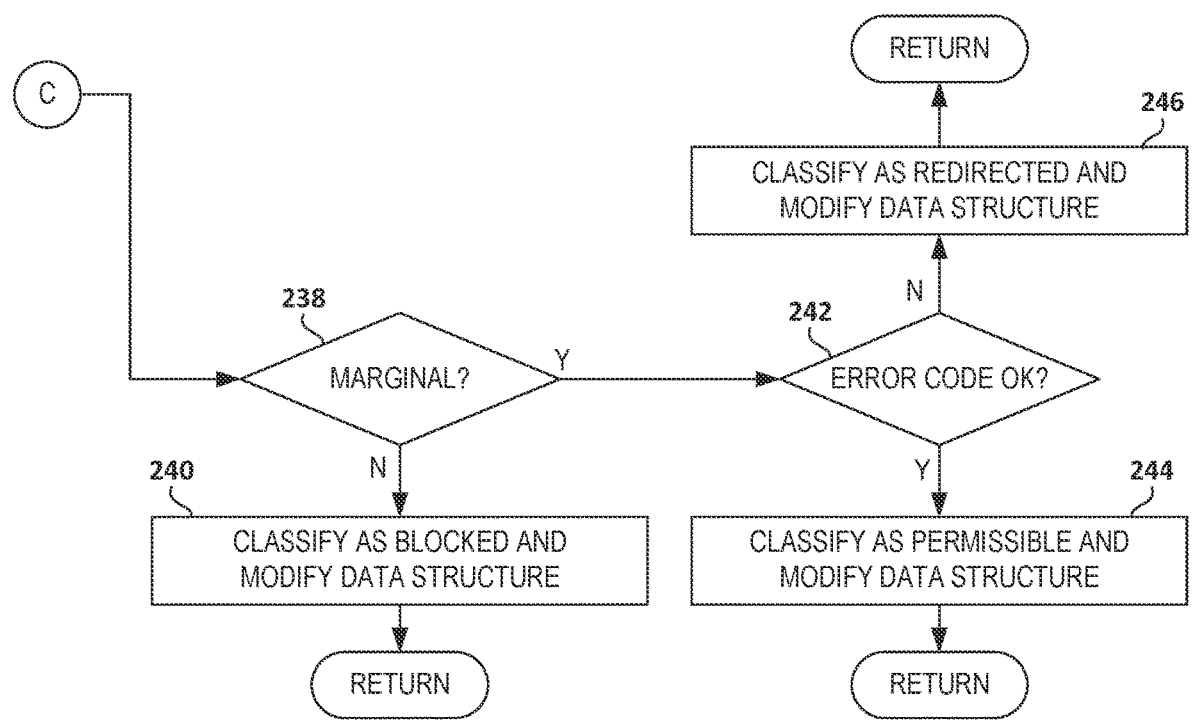
Figure 2E:
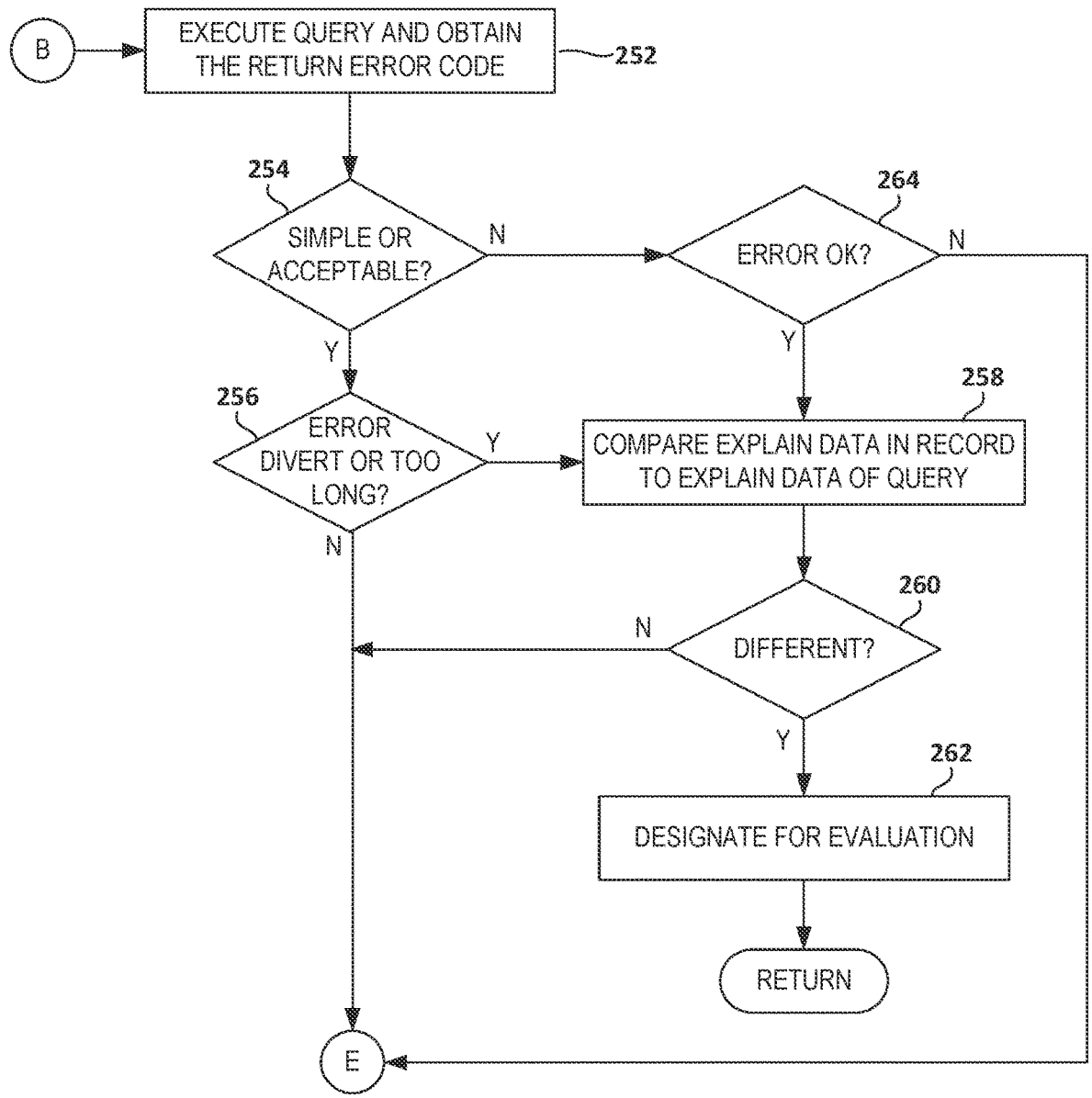

If, at block 214 in FIG. 2B, the analysis module 170 determines that the query fingerprint corresponding to the received query request is included in an existing data structure and has been designated as "pending evaluation." Being designated as "pending evaluation" means that the query has been previously flagged for evaluation in response to subsequently receiving another query request having the fingerprint in the future. The query execution engine 130 prepares to obtain the handler statistics at block 216 to evaluate the query. The handler statistics collected by the query execution engine 130 include both session and global values. To obtain the handler statistics for execution of this one specific query, the query execution engine 130 can determine the difference between the statistic values to be collected before and after the query, for example.

According to another embodiment, the session counter can be reset to zero using an appropriate command such as "FLUSH STATUS" before execution of the query, for example. The handler statistic values collected after execution of the query contain only those attributed to execution of this particular query. Regardless of the approach used to obtain the handler statistics, the query cache should not be considered to obtain accurate handler statistics. If the query cache includes an identical query, the query execution engine will return cached results instead of those for the execution of the present, specific query. Thus, the session query cache should be turned off temporarily to obtain the current handler statistics for the present search.

After the appropriate preparations have been made, the query execution engine 130 initiates execution of the received query at block 218 and obtains the returned error code. As mentioned above, the returned error code indicates the amount of time execution of the query took to complete. The error code can indicate that execution of the query did not exceed the completion threshold time (e.g., "OK"), significantly exceeded the completion threshold time (e.g., "TOO LONG"), or exceeded the completion threshold time, but only by a limited margin defined as being tolerable (e.g., "DIVERT").

At block 220, the analysis module 170 retrieves, receives or otherwise accesses the handler statistics 175 obtained by the query execution engine 130 for the present query at block 220. Similarly, the analysis module 170 accesses the query explain data 165 at block 222. The accessed handler statistics 175 and query explain data 165 can be temporarily stored in a memory coupled to the analysis module 170 for the present evaluation, and updated each time an updated evaluation is required.

The evaluation performed by the analysis module 170 at block 224 is based on the returned error code, the handler statistics 175, and the explain data 165 for the query presently invoked. Evaluation of the queries or the query fingerprints classifies the queries or fingerprints as belonging to one of a plurality of different classes. For example, the query can be classified into one of four classes as follows:

Simple Query

The analysis module 170 determines at block 226 whether the query fingerprint corresponds to a simple query. A simple query is defined not based primarily on cost, but using only constant or unique keys that will resolve to a single row, at minimal cost. Accordingly, the test for a simple query can be performed based on the query explain data 165, independently of the handler statistics 175. To test for a "simple" query, the rows or other portions of the query explain data can be examined. One embodiment of a simple query requires:

(1) The first row of the first select ID must have a join_type of "system" or "const" and rows=1;
(2) subsequent rows of the first select ID must have join_type "eq_ref"
(3) For each select ID after the first one:
   (a) If the select_type is not "UNION," all rows of the select ID must have join_type "eq_ref;"
   (b) Else if the select_type is "UNION":
      (i) The first row of the select ID must be "system" or "const" and rows=1
      (ii) The subsequent rows of the select ID must have join_type "eq_ref."

As a specific example, a query with a fingerprint to "select object by ID" is a simple query. A fingerprint for a simple query identified at block 226 is classified in the permissible query class (e.g., added to the whitelist) at block 228, meaning that the query execution engine 130 is to execute the query utilizing the fingerprint in response to future invocations. The data structure 180 for this permissible query is also modified at block 228 to remove the flag or other designation indicating that this query requires evaluation. As a result, a future invocation of the permissible query fingerprint will cause the query execution engine 130 to execute the corresponding query without performing the evaluation that was performed to classify the query fingerprint as permissible.

Acceptable Query

If the query is not determined to be simple at block 226, then an evaluation is made based on the cost of the query to determine whether the query is at least acceptable at block 230. Such a cost can be obtained as the sum of weighted handler statistic values according to the present embodiment. The query explain data for a query can be used to vary weights assigned to the individual handler statistics 175. According to another embodiment, however, a static weight can be assigned to each of the different handler statistic values. For example, weights can be assigned to handler statistic values to indicate the cost associated with each handler statistic. A handler statistic such as the number of times the first entry in an index is read ("handler_read_first") can be assigned a weight of two (2). A statistic for a sequential operation such as the number of requests to read the next row in key order ("handler_read_next") can be assigned a weight of one (1). The handler_read_first statistic is afforded a relatively-costly weight compared to the handler_read_next statistic because the handler_read_first operation more-frequently requires data block reads to load the row information than the handler_read_next statistic. An item such as handler_read_next that is weighted one (1) is accessed in sequential order, and requires only the row value to be incremented. To the contrary, the handler_read_first may involve locating a row with the relevant data instead of locating the next row in a table, and is more computationally costly.

An acceptable query is one that is not simple (e.g., has a higher cost than a simple query), but has a cost that does not exceed an acceptable threshold cost. The acceptable threshold cost corresponds roughly to a query that can be fully executed in less than X seconds against a database during periods of relatively-low loading of that database, based on the weighted handler statistics. For example, X can be any integer that is greater than zero (0) and less than thirty (30) (e.g., 1 second, 5 seconds, 10 seconds, etc.). Although specific examples of X are used herein for illustrative purposes, other values can be assigned to X without departing from the scope of the present disclosure.

If the query is deemed to be acceptable based on the evaluation at block 230, the classification of the query also depends on the error code returned as a result of execution of the query. At block 232, the analysis module 170 determines whether the returned error code was "OK" or "DIVERT." If so, the query fingerprint is classified as permissible (e.g., whitelisted) at block 234, and the data structure 180 is modified to reflect this classification and remove the flag or other designation that the query requires evaluation. As a result, future invocations of queries utilizing the query fingerprint can be executed by the query execution engine 130 without repeating the evaluation.

If the analysis module 170 determines at block 232 that the returned error code for the current invocation of the query is any other code such as "TOO LONG," the data structure 180 is modified at block 236 (FIG. 2C) to reflect classification of the query fingerprint in the redirected query class. Future invocations of the query can be executed, but should be redirected by the query execution engine 130 against the reporting database 140 instead of against the operational database 125.

Marginal Query

If, at block 230 (FIG. 2B), the query is determined to be unacceptable, then an evaluation is made at block 238 (FIG. 2D) to determine whether the query is marginal. The cost evaluation conducted to identify a query as marginal is analogous to the cost evaluation described for identifying an acceptable query. However, the cost of a marginal query is higher than the cost of an acceptable query. Recall that the acceptable threshold cost corresponds roughly to a query that can be fully executed in less than X seconds against a database during periods of relatively-low loading of that database. The value of X for an acceptable query was defined as being any positive integer that is less than thirty (30). To be a marginal query, however, the value of X can be at least thirty (30) seconds, but less than sixty (60) seconds, under comparable database loading conditions. Although specific examples of X are used herein for illustrative purposes, other values can be assigned to X without departing from the scope of the present disclosure.

If the query is deemed not to be at least marginal based on the evaluation at block 238, the query fingerprint is classified in the blocked query class (e.g., blacklisted) at block 240. Such a classification by the analysis module 170 will cause the query execution engine 130 to prevent the query from being executed against either the operational database 125 or the reporting database 140 in response to future invocations of the query. Blocked queries are considered too computationally expensive to execute and, if executed, will cause a significant negative impact on the performance of the application object.

If the query fingerprint is deemed to be marginal based on the evaluation at block 238, the classification of the query depends next on the error code returned as a result of the current execution of the query. At block 242, the analysis module 170 determines whether the returned error code was "OK." If so, the query fingerprint is classified as permissible (e.g., whitelisted) at block 244, and the data structure 180 is modified to reflect this classification and remove the flag or other designation that the query requires evaluation. As a result, future invocations of the query fingerprint can be executed for queries by the query execution engine 130 without repeating the classification evaluation in response to those invocations.

If the analysis module 170 determines at block 242 that the returned error code for the current invocation of the query is any other code such as "DIVERT" or "TOO LONG," the data structure 180 is modified at block 246 to reflect classification of the query fingerprint in the redirected query class. As a result, future invocations of the query can be executed, but should be redirected by the query execution engine 130 for execution against the reporting database 140 instead of the operational database 125.

The description above addresses the scenario where the flag or other designation in the data structure 180 for a query indicates that evaluation is required. Setting the flag or designation can be triggered in response to a long duration of a query the first time that query is invoked. Once the query has been evaluated and classified as described above, the flag or other designation is cleared from the data structure 180. Referring once again to the decision at block 214 (FIG. 2B), the present system and method can adapt to changes in the operational database 125 or the reporting database 140 that may result in a change of a query's classification. For example, there may have been a substantial increase in the quantity of data in the operational database 125 or reporting database 140 since a query fingerprint was classified. Changes may have been implemented in the communication network 120. For example, a significant number of additional client terminals may have been added to an enterprise that utilizes the operational database 125 or reporting database 140. Factors such as these, which are unrelated to a query fingerprint that has not changed since being classified, may affect the proper classification of that query fingerprint. For example, a fingerprint that was previously classified in the permissible query class may now be too expensive to be executed against the operational database 125 because of an increase in the quantity of data in the operational database 125.

If, at block 214, the analysis module 170 determines that the query fingerprint corresponding to a query that has been invoked is not pending evaluation, then the analysis module 170 determines, at block 248, whether the query has previously been classified in the blocked query class (e.g., blacklisted). If so, the analysis module 170 controls operation of the query execution engine 130 at block 250 based on the classification in the data structure 180 to prevent execution of the query against the operational database 125 or the reporting database 140. A notification indicating that the query is not permitted can optionally be transmitted by the database system 100 to notify the client terminal 105, 110, 115 that the query was not executed.

If the query invoked is not blocked, as determined at block 248, the query is executed at block 252 (FIG. 2E) according to the classification of the corresponding query fingerprint in the data structure 180. For example, if the classification for the corresponding query fingerprint is "permissible," the query is executed against the operational database 125 without conducting the above evaluation in response to the present invocation of the query. Otherwise, if the classification for the corresponding query fingerprint is "divert," the query is executed, but redirected to be executed against the reporting database 140 instead of the operational database 125. Again, the query can be executed without conducting the above evaluation in response to the present invocation of the query.

The data structure 180 for the executed query is analyzed by the analysis module 170 to determine, at block 254, whether the fingerprint for the query was originally determined to be a simple query or an acceptable (e.g., a whitelisted) query. If so, the analysis module 170 then determines whether the classification in the data structure 180 for the query fingerprint may need to be re-evaluated based, at least in part, on: (i) the returned error code for the current invocation of the corresponding query, and (ii) the current classification of the query fingerprint.

At block 256, the analysis module 170 determines whether the execution time of the query exceeded the completion threshold time. If so, the execution time for a query having a fingerprint that was previously classified as "permissible" now exceeds the completion threshold time. As a result of this condition, a change unrelated to the structure of the query fingerprint may have occurred, and may warrant a modification of the classification for the query fingerprint stored in the data structure 180. Similarly, at block 254 the analysis module 170 may determine that the executed query was not a simple or acceptable (e.g., not a whitelisted) query, but a query classified in the divert query class instead. However, the currently-invoked query may result in the "OK" error being returned as determined at block 264. The return of an error code of "OK" is more indicative of a simple or acceptable query than a query classified in the divert query class. Again, a change unrelated to the structure of the corresponding query fingerprint may have occurred, and may warrant a modification of the classification for the query fingerprint in the data structure 180.

To determine whether the classification should be modified, explain data for the current invocation of the query is obtained by the analysis module 170. The analysis module 170 compares the obtained explain data for the current invocation to the explain data corresponding to the existing classification of the query fingerprint stored in the data structure 180 at block 258. If, at block 260, the comparison reveals that the explain data corresponding to the query fingerprint for the current invocation is different from that for the invocation of the query that resulted in the classification, the flag or other designation can be reset at block 262. Resetting the flag or other designation in the data structure 180 indicates that the query fingerprint once again requires evaluation. The reset flag or other designation will cause the analysis module 170 to determine that the query fingerprint requires evaluation at block 214 (FIG. 2B) in response to the next, or other subsequent invocation. This determination causes the analysis module 170 to commence the evaluation process described herein in response to a future invocation of a query having the subject query fingerprint. Repetitively designating a query fingerprint for evaluation in response to evolving triggering events allows for adaptive handling of query loads that may result from changes to a database environment, even if the query fingerprint itself has not changed.

The determination at block 256 may indicate that the execution time of the query did not exceed the completion threshold time, as expected of a permissible query. Similarly, the returned error code for a query in the diverted query class may indicate that the execution time of that query did exceed the completion threshold time at block 264, also as expected. Even though such queries were executed as expected, the query fingerprint corresponding to each of these queries may still be ripe for re-evaluation to improve the performance of the application object.

Figure 2F:
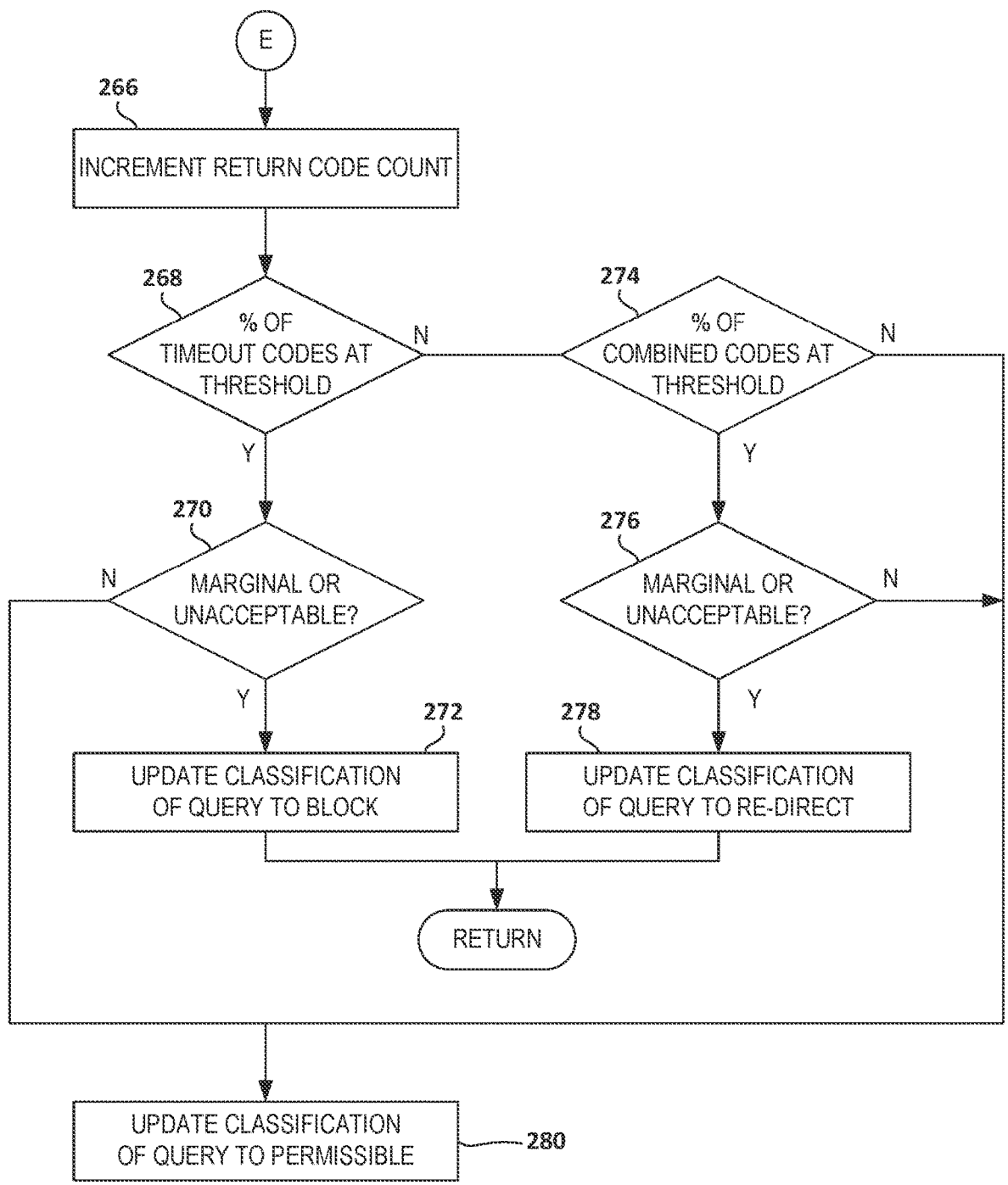

A currently-invoked query can have a query fingerprint that is to be re-evaluated based on a trend involving the query, instead of the result of a single invocation of the query as the triggering event. For example, the data structure 180 for a query fingerprint can include a counter field. Each invocation of a query that is executed causes a return code to be returned for the corresponding query fingerprint. The running total number of error codes returned for a query fingerprint can be stored in the counter field, and incremented as each error code is returned at block 266 (FIG. 2F). Once a defined number of error codes have been returned for a query fingerprint, the trend of error codes can be analyzed to determine whether the query fingerprint is to be re-evaluated. As part of such an analysis, at block 268, the analysis module 170 determines whether at least a timeout threshold percentage of the total number of returned error codes for a query fingerprint were TOO LONG. If so, the analysis module 170 determines determined whether the cost of the query fingerprint of the currently-executed query is at least as costly as a marginal query at block 270. If so, the data structure 180 for query fingerprint is modified at block 272 to classify the query fingerprint in the blocked query class at block 272, and to set the flag or other designation indicating the query fingerprint requires evaluation.

If, at block 268, the timeout threshold percentage of returned error codes is not met, the analysis module 170 determines whether the combined number of DIVERT error codes and TOO LONG error codes make up at least a combined threshold percentage of all returned error codes at block 274. If so, and if the cost of the query fingerprint of the currently-executed query is determined to be at least as costly as a marginal query at block 276, the data structure 180 for the query fingerprint is modified at block 278. The data structure 180 is modified to classify the query fingerprint in the re-direct query class at block 278, and the flag or other designation indicating the query fingerprint requires evaluation is set.

If, after the defined number of error codes have been returned for a query fingerprint, neither the timeout threshold percentage at block 268 nor the combined threshold percentage at block 274 of all returned error codes has been met, the data structure 180 can also be modified. For example, at block 280 the data structure 180 can be modified to classify the query fingerprint corresponding to the currently-executed query in the permissible query class. The flag or other designation indicating that the query fingerprint requires evaluation in response to a future invocation of the corresponding query can also be set at block 280.

Similar modifications at block 280 can also be made in response to different query trends. For example, after the defined number of error codes have been returned for a query fingerprint, and if the timeout threshold percentage has not been met at block 268, the cost of the query fingerprint can be analyzed. If, the cost of the query fingerprint corresponding to the currently-executed query is determined at block 270 to be less costly than a marginal query, then the data structure 180 can be modified to classify the query fingerprint corresponding to the currently-executed query in the permissible query class. Such a scenario is indicative of a previously-classified query that exhibits a trend of a lessening impact on the performance of the application object. The flag or other designation indicating that the query fingerprint requires evaluation in response to a future invocation of the corresponding query can also be set at block 280.

As another example, after the defined number of error codes have been returned for a query fingerprint, the data structure 180 can be modified at block 280 if: (i) the timeout threshold percentage has not been met at block 268, (ii) the combined threshold percentage has not been met at block 274, and (iii) the cost of the query fingerprint corresponding to the currently-executed query is determined at block 276 to be less costly than a marginal query. The data structure 180 can be modified to classify the query fingerprint corresponding to the currently-executed query in the permissible query class. Such a scenario is also indicative of a previously-classified query that exhibits a trend of a lessening impact on the performance of the application object. The flag or other designation indicating that the query fingerprint requires evaluation in response to a future invocation of the corresponding query can also be set at block 280.

In one embodiment, the query processing steps of any of the FIGS. 2A-2F may be performed for a plurality of queries that are received by the database system and requested for execution. In general, the plurality of queries will include first time queries (no matching fingerprint) and subsequent queries (matching fingerprint) and the system is configured to handle both types of queries as described above.

Computing Device Embodiment

Figure 3:
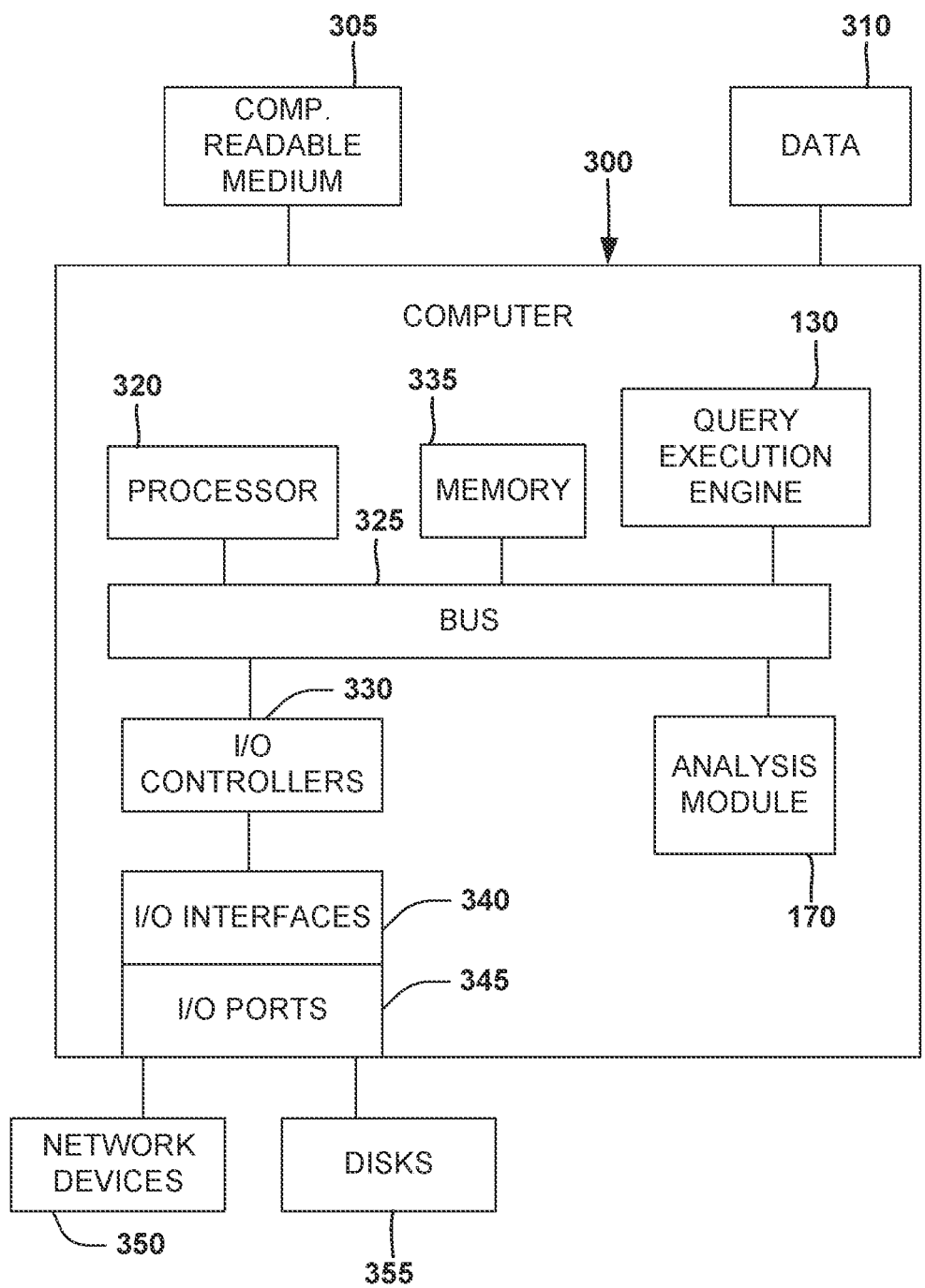
FIG. 3 illustrates one embodiment of a computing system configured with the embodiments of the systems and/or methods disclosed.

FIG. 3 illustrates an example computing device that is configured and/or programmed with one or more of the example systems and methods described herein, and/or equivalents. The example computing device may be a computer 300 that includes a processor 320, a memory 335, and input/output ports 345 operably connected by a bus 325. In one example, the computer 300 may include logic defining a query execution engine 130 and an analysis module 170 configured to facilitate query load assessment and adaptive handling of query loads similar to the database system 100 shown in FIG. 1. In different examples, the logic 130, 170 may be implemented in hardware, a non-transitory computer-readable medium 305 with stored instructions, firmware, and/or combinations thereof. While the logic 130, 170 is illustrated as a hardware component attached to the bus 325, it is to be appreciated that in other embodiments, the logic 130, 170 could be implemented in the processor 320, stored in memory 335, or stored in disk 355.

In one embodiment, logic 130, 170 or the computing device 300 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to assess and adaptively handle query loads to mitigate a negative impact on the performance of an application object. The means may also be implemented as stored computer executable instructions that are presented to the computing device 300 as data 310 that are temporarily stored in memory 335 and then executed by processor 320.

Logic of modules 130, 170 may also provide means (e.g., hardware, non-transitory computer-readable medium that stores executable instructions, firmware) for performing the assessment and adaptive handling of query loads.

Generally describing an example configuration of the computer 300, the processor 320 may be a variety of various processors including dual microprocessor and other multi-processor architectures. A memory 335 may include volatile memory and/or non-volatile memory. Non-volatile memory may include, for example, ROM, PROM, and so on. Volatile memory may include, for example, RAM, SRAM, DRAM, and so on.

A storage disk 355 may be operably connected to the computing device 300 via, for example, an input/output (I/O) interface (e.g., card, device) 340 and an input/output port 345. The disk 355 may be, for example, a magnetic disk drive, a solid state disk drive, a floppy disk drive, a tape drive, a Zip drive, a flash memory card, a memory stick, and so on. Furthermore, the disk 355 may be a CD-ROM drive, a CD-R drive, a CD-RW drive, a DVD ROM, and so on. The memory 335 can store a process and/or a data 310, for example. The disk 355 and/or the memory 335 can store an operating system that controls and allocates resources of the computing device 300.

The computing device 300 may interact with input/output (I/O) devices via the I/O interfaces 340 and the input/output ports 345, which are connected to the bus 325 by an I/O controller 330. Input/output devices may be, for example, a keyboard, a microphone, a pointing and selection device, cameras, video cards, displays, the disk 355, the network devices 350, and so on. The input/output ports 345 may include, for example, serial ports, parallel ports, and USB ports.

The computing device 300 can operate in a network environment and thus may be connected to the network devices 350 via the I/O interfaces 340, and/or the I/O ports 345. Through the network devices 350, the computing device 350 may interact with a network. Through the network, the computing device 300 may be logically connected to remote computers such as the client terminals 105, 110, 115. Networks with which the computing device 300 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that, when executed by at least a processor of a computing system, cause the computing system to:
   receive a plurality of queries that are requested for execution on a database system;
   define a fingerprint for each received query from the plurality of queries based at least in part on one or more statements from the received query;
   wherein the one or more statements from the received query define one or more operations in the received query to be performed, wherein multiple queries can have the same fingerprint based on the one or more statements but are not identical queries;
   for each received query, determine whether the defined fingerprint matches or does not match an existing fingerprint by comparing the fingerprint of the received query to fingerprint records in a data structure;
   wherein the fingerprint records include existing fingerprints for previously received queries where each existing fingerprint for an associated query is defined based on one or more statements from the associated query;
   for queries from the plurality of queries received having a fingerprint that does not match an existing fingerprint:
      execute the query to completion by the database system;
      determine, by at least the processor, whether the query executed has an execution duration that exceeds a completion threshold;
      set a classification for the fingerprint of the executed query based on whether the completion threshold is exceeded, wherein the classification is selected from a group comprising (i) is flagged for evaluation, and (ii) is permissible for execution; and
      store, by at least the processor, the fingerprint corresponding to the executed query including the classification in the data structure;
   for queries from the plurality of queries received having a fingerprint that matches an existing fingerprint in the fingerprint records which identifies the query as a previously received query:
      (i) determine whether the fingerprint was previously flagged for evaluation based on the classification of the fingerprint;
      (ii) in response to the fingerprint having the classification as being flagged for evaluation:
         (a) evaluate statistics for the fingerprint to determine whether execution of the query request will cause a negative impact on the database system; and
         (b) modify, by at least the processor based on a result of the evaluation, the classification of the fingerprint to classify the fingerprint as one classification selected from a group comprising permissible for execution and blocked; and
      (iii) control, by at least the processor, execution of the query based on the classification of the fingerprint.

2. The non-transitory computer-readable medium of claim 1, further comprising instructions that, when executed by at least the processor, cause the computing system to:
   classify the fingerprint based on the result of the evaluating by assigning the fingerprint to: (i) a permissible query class, or (ii) a blocked query class;
   wherein (i) if the fingerprint is assigned to the permissible query class, a subsequent query request is executed to completion without evaluating the statistics, and (ii) if the fingerprint is assigned to the blocked query class, the subsequent query request is blocked from being executed.

3. The non-transitory computer-readable medium of claim 1, wherein the statistics comprise query explain data or database server handler statistics.

4. The non-transitory computer-readable medium of claim 1, wherein the statistics to be evaluated exclude database performance statistics that require utilization of an inactive database resource to obtain.

5. The non-transitory computer-readable medium of claim 1, wherein the classification includes a plurality of different query classes that may be assigned and comprise a permissible query class for fingerprints corresponding to queries that are to be executed against a first database.

6. The non-transitory computer-readable medium of claim 5, wherein the plurality of different query classes further comprises a redirected query class for fingerprints corresponding to queries that are to be executed against a second database, which is different than the first database.

7. The non-transitory computer-readable medium of claim 6, further comprising instructions that, when executed by at least the processor, cause the computing system to:
cause execution of a first query against the first database; and
cause execution of a subsequent query request for the first query against the second database based on classification of the fingerprint in the redirected query class.

8. The non-transitory computer-readable medium of claim 1, further comprising instructions that, when executed by at least the processor, cause the computing system to:
prevent evaluation of the statistics to classify the fingerprint in response to execution of the query that resulted in the fingerprint being flagged for evaluation.

9. A computing system, comprising:
at least one processor connected to at least one memory; and
a non-transitory computer readable medium including instructions stored thereon that, when executed by the at least one processor, cause the computing system to:
define a fingerprint for each received query from a plurality of queries that are requested for execution on a database system;
wherein the fingerprint for a received query is based, at least in part, on one or more statements from the received query;
for each received query, determine whether the defined fingerprint matches or does not match an existing fingerprint by comparing the fingerprint of the received query to fingerprint records in a data structure;
for queries having a fingerprint that does not match an existing fingerprint:
execute the query to completion by the database system;
determine, by at least the processor, whether the query executed has an execution duration that exceeds a completion threshold; and
set a classification for the fingerprint indicating the query is classified as one classification from a group comprising (i) is flagged for evaluation and (ii) is permissible, based on whether the completion threshold is exceeded;
for queries having a fingerprint that matches an existing fingerprint in the fingerprint records, which identifies the query as a previously received query:
(i) determine whether the fingerprint was previously flagged for evaluation based on the classification of the fingerprint;
(ii) in response to the fingerprint having the classification as being flagged for evaluation:
(a) evaluate statistics for the fingerprint to determine whether execution of the query request will cause a negative impact on the database system; and
(b) modify, by at least the processor, the classification of the fingerprint to classify the fingerprint as one classification selected from a group comprising permissible and blocked, based on a result of the evaluation; and
(iii) control, by at least the processor, execution of the query based on the classification of the fingerprint.

10. The computing system of claim 9, wherein the instructions are configured to define the fingerprint for a received query by identifying the one or more statements in the received query including one or more operations in the received query to be performed;
wherein multiple queries can have the same fingerprint based on the one or more statements but are not identical queries; and
wherein the computing system maintains the fingerprint records including existing fingerprints for previously received queries, where each existing fingerprint for an associated query is defined based on one or more statements from the associated query.

11. The computing system of claim 9, wherein the statistics comprise query explain data or database server handler statistics.

12. The computing system of claim 9, wherein the statistics to be evaluated exclude database performance statistics that involve utilization of inactive database resources.

13. The computing system of claim 9, wherein the classification includes a plurality of different query classes that may be assigned and comprise a permissible query class for fingerprints corresponding to queries that are to be executed against a first database.

14. The computing system of claim 13, wherein the plurality of different query classes further comprises a redirected query class for fingerprints corresponding to queries that are to be executed against a second database, which is different than the first database.

15. The computing system of claim 9, wherein the instructions to control the execution of the query based on the classification of the fingerprint further include instructions that, when executed by the at least one processor, cause the computing system to:
cause execution of the query against a first database based on the classification being set as permissible; and
cause execution of the subsequent query request against a second database based on the classification of the fingerprint being set as a redirected query class.

16. The computing system of claim 9, wherein the instructions further include instructions that, when executed by the at least one processor, cause the computing system to:
prevent evaluation of the statistics for a fingerprint for queries having a fingerprint that does not match an existing fingerprint.

17. A computer-implemented method, the method comprising:
receiving a plurality of queries that are requested for execution on a database system;

defining a fingerprint for each received query from the plurality of queries based at least in part on one or more statements from the received query;

for each received query, determining whether the defined fingerprint matches or does not match an existing fingerprint by comparing the fingerprint of the received query to fingerprint records in a data structure;

for queries, from the plurality of queries received, having a fingerprint that does not match an existing fingerprint:
   executing the query to completion by the database system;
   determining, by at least a processor, whether the query executed has an execution duration that exceeds a completion threshold; and
   setting a classification for the fingerprint indicating the query is one classification selected from a group comprising (i) is flagged for evaluation and (ii) is permissible, based on whether the completion threshold is exceeded;

for queries having a fingerprint that matches an existing fingerprint in the fingerprint records which identifies the query as a previously received query:
   (i) determining whether the fingerprint was previously flagged for evaluation based on the classification of the fingerprint;
   (ii) in response to the fingerprint being flagged for evaluation:
      (a) evaluating statistics for the fingerprint to determine whether execution of the query request will cause a negative impact on the database system; and
      (b) modifying, by at least the processor, the classification of the fingerprint to classify the fingerprint as permissible or blocked, based on a result of the evaluation; and
   (iii) controlling, by at least the processor, execution of the query based on the classification of the fingerprint.

18. The method of claim 17, wherein defining the fingerprint for a received query includes:

identifying the one or more statements from the received query including one or more operations in the received query to be performed, wherein multiple queries can have the same fingerprint based on the one or more statements but are not identical queries.

19. The method of claim 17, wherein the plurality of queries includes (i) a first set of queries that have fingerprints that do not match an existing fingerprint, wherein the first set of queries are queries that are received for the first time by the database system, and (ii) a second set of queries that have fingerprints that match an existing fingerprint.

20. The method of claim 17, wherein controlling execution of the query based on the classification of the fingerprint comprises:

executing a query execution engine that is configured to control execution of the query based on the classification.

* * * * *